United States Patent [19]
Guyonnet

[11] 3,848,313

[45] Nov. 19, 1974

[54] FRICTION ARMATURE WITH FRICTION AND MAGNETIC LININGS

[75] Inventor: Jean-Francis Guyonnet, Paris, France

[73] Assignee: Centre National De La Recherche Scientifique, Paris, France

[22] Filed: May 18, 1971

[21] Appl. No.: 144,492

Related U.S. Application Data
[63] Continuation-in-part of Ser. No. 766,153, Oct. 9, 1968, abandoned.

[30] Foreign Application Priority Data
Oct. 11, 1967 France .......................... 67.124111
Sept. 27, 1968 France .......................... 68.168044
Dec. 11, 1970 France ............................ 70.44678

[52] U.S. Cl. ........................ 29/191.2, 192/107 M
[51] Int. Cl. ............................................. B32b 15/00
[58] Field of Search ................... 75/170; 29/191.2; 192/107 M

[56] References Cited
UNITED STATES PATENTS
2,925,896  2/1960  Jaeschke ................... 192/107 M X
3,091,022  5/1963  Faulkner ........................... 75/170 X
3,221,853  12/1965  Batchelor et al. .......... 192/107 M X
3,305,326  2/1967  Longo ................................ 75/170 x
3,419,415  12/1968  Dittrich ............................ 29/192 R
3,466,243  9/1969  Buckley et al. .................... 75/170 X Primary Examiner—A. B. Curtis
Attorney, Agent, or Firm—Weiser & Stapler

[57] ABSTRACT

A friction lining according to the inventon is formed of bounded solidified previously molten particles formed on its support by plasma deposition; the base planes 0001 of a major proportion of the crystals in said lining are oriented in directions substantially parallel to the friction surfaces; the materials of which said linings are formed contain metals, metallic oxides or carbides having high melting points; they include cobalt, magnesium, neodymium, titanium, tungsten under its hexagonal form, yttrium, nickel under its hexagonal form, MoC, $Mo_2C$, NbC, $Nb_2C$, $Ta_2C$, WC, $W_2C$, $V_2C$, $Cr_2O_3$, $TiO_2$; they may contain under an alloyed form proportions of non hexagonal materials, including molybdenum, chromium, aluminum, copper, iron, the non hexagonal nickel, niobium, $B_4C$, TaC, TiC, $Cr_3C_2$, VC, ZrC, $ZrO_2$, $Al_2O_3$, which do not affect the hexagonal structure of the alloys obtained.

5 Claims, 19 Drawing Figures

INVENTOR

BY

ATTORNEY

FRICTION ARMATURE WITH FRICTION AND MAGNETIC LININGS

This is a continuation-in-part of the U.S. Pat. application Ser. No. 766,153 filed on Oct. 9, 1968 and was abandoned.

The invention relates to linings for the surfaces of the parts of apparatuses, such as brakes, clutches or also rotary seals, which are able to enter in frictional engagement, said linings being of the type of those which are free of organic components and which are able to work under particular severe conditions, for instance under high temperatures or in the absence of distinct lubricants.

The invention also relates to a process for producing such linings as well as to particular applications, for instance to the forming of friction linings for electromagnetic brakes or clutches.

It is known that, irrespective of the type of application contemplated, such linings must exhibit both satisfactory friction properties as regards the progressivity and regularity of the friction contact, without siezing, especially when the surfaces are applied against one another, on the one hand, and a high resistance to wear, on the other hand. These requirements appear generally as contradictory to each other, in that the known friction materials are usually relatively soft and accordingly undergo a rapid wear when they have the desired friction characteristics or, in the contrary, do not exhibit the required friction properties when they resist to wear. Especially most of the hard materials, such as oxides or carbides of a number of metals, which exhibit high melting points, belong to the last mentioned category of materials.

Accordingly in order to meet the two, prima faciae, contradictory requirements, many of the known linings are formed of particles of a hard material, whose purpose is to improve the resistance to wear, embedded in a softer material acting more or less as a binder and purporting to confer the desired friction characteristics to the said linings.

In most instances however, these linings are not satisfactory either. For instance when the friction surfaces are pressed against one another under a relatively high force, as is the case for the opposite friction surfaces of brakes, it will be observed that the hard points of these linings resulting from the protruding on their surfaces of the hard particles produce, especially when they enter in mutual frictional engagement, local increases of temperature and pressure which involve a melting or at least ] softening 6f the 2urrounding 2inder 6r softer material, where by the latter tends to be extruded and the hard particles are removed and cause a rapid attrition and deterioration of the surfaces.

It has however been found that certain categories of hard materials are likely to exhibit, in addition to their known resistance to wear, satisfactory properties as regards the friction, when they belong to a determined cristallographic system and when a particular structure is conferred to the linings formed of said hard materials.

The lining according to the invention is formed of a layer whose components belong to the class of metals, metallic oxides and carbides or the alloys which they form with one another and which form crystals belonging to the hexagonal system, the base planes 0001 of the major part of these crystals being oriented in directions substantially parallel to the surface on which said lining is formed.

In the preferred linings, the crystals which adhere to each other, have sizes ranging from about 10 to about 75 microns, the base planes 0001 of 75 or even 80 percent at least of these crystals being oriented in directions substantially parallel to the friction surface.

A process according to the invention for forming said linings, comprises injecting in the plasma jet produced by a plasma torch oriented towards the surface on which the lining is to be formed, particles of those of the materials which in their molten form are capable of forming the above lining, the points of injections of these particles into the plasma jet being so chosen and the ejection velocity of the latter being controlled such that the injected particles be molten during the time they are maintained in the plasma jet.

Preferably, recourse is had to an additional feature of the invention, which consists in forming a gaseous barrier in a direction transverse to the plasma flow and to the path of the particles carried by said plasma jet, between the outlet of the plasma generator and the support, under a flow and a speed able to break the stream of the plasma jet hot gases, whereby the molten particles are projected on the support without deviation because of the high kinetic energy imparted to them within the plasma jet.

Preferably, the sizes of the major part of the particles injected into the plasma jet range from about 10 to about 70 microns, preferably from about 20 to about 40 microns.

The support is held at a distance of the generator greater than the length of the visible tip of the plasma jet and the gaseous barrier is advantageously formed substantially at the level of the tip extremity.

It has been found that this gaseous barrier also removes those of the particles which did not penetrate within the heart of the plasma jet, but were only carried at the periphery of the plasma jet, tangentially thereto, which accordingly have not been completely molten and which do not possess a sufficient kinetic energy to pass through the gaseous barrier without substantial deviations.

An important result achieved by the process according to the invention lies thus in the fact that the lining which is formed on the support consists essentially of solidified previously molten particles of the materials considered.

The layers or linings so obtained, when their crystals possess the above mentioned hexagonal structure, do exhibit a characteristic appearance, especially when the particles have undergone a complete melting. A systematic study of these linings shows that their surfaces exhibit an homogeneous appearance and that they are free of hard abrading points.

The X-rays or electronic diffraction investigations also bring into evidence the preferential orientation of the majority, namely of more than 75 or even 80 percent of the crystals in the lining, with their base planes 0001 substantially oriented in directions parallel to the surface on which the lining has been formed. This is a particular advantageous result, since, as this has been found, these materials exhibit their best friction characteristics when the base planes of their crystals exhibit the above orientation.

It has been found that this orientation enables the superficial layers of the lining to simultaneously undergo a plastic deformation and to permanently reorganize themselves under the friction effect, thanks to relatively small displacements of the atoms, by the bringing into play not only of the preferential gliding planes 0001 but also of the many other prismatic and pyramidal planes which characterize the hexagonal structure.

Preferably the linings of two surfaces engaging in friction are both constituted in accordance with the invention, whereby the preferential orientations of the base planes 0001 of their respective crystals are substantially parallel with one another and produce, between the surfaces in frictional engagement, a true friction torque which results in an important reduction of their respective wears.

Nevertheless, it is preferred to use wear resistant and hard materials for forming the said linings. Materials having a hardness equal or greater to 1,000 Vickers units have been found to be appropriate for forming the linings.

Particularly suitable metals, oxides or carbides for use in such linings are indicated in the Table I herebelow. The lattice relations c/a of these materials (ratio of the distance c separating two neighbouring planes parallel to the base plane 0001 in the lattice to the distance a between two adjacent atoms in a same plane of this type) are also indicated in the Table I.

TABLE I

| Material | c/a |
| --- | --- |
| Cobalt | 1.624 |
| Magnesium | 1.623 |
| Neodymium | 1.612 |
| Titanium | 1.587 |
| Tungsten (hexagonal form) | 1.61 |
| Yttrium | 1.572 |
| Nickel (hexagonal form) | 1.59 |
| Mo C | 0.969 |
| Mo$_2$C | 1.574 |
| NbC | 0.861 |
| Nb$_2$C | |
| Ta$_2$C | 1.59 |
| WC | 0.976 |
| W$_2$C | 1.578 |
| V$_2$C | 1.59 |
| Cr$_2$O$_3$ | 2.761 |
| TiO$_2$ | 1.246 |

The friction linings may be constituted of these materials taken alone or alloyed with one another. They may also be combined or alloyed to materials which do not possess a crystalline hexagonal structure themselves, these last materials then being taken in proportions compatible with the preservation in the phases obtained of the original hexagonal structure of the hexagonal compounds. Such non hexagonal materials may consist, for instance, of metals such as molybdenum, chromium, aluminum, copper, iron, the non hexagonal nickel, hiobium; carbides such as B$_4$C, TaC, TiC, Cr$_3$C$_2$, VC, ZrC; or oxides such as ZrO$_2$, Al$_2$O$_3$, etc.

It has been found that those of the hexagonal materials which possess the best friction characteristics, and which are the most unlikely to undergo seizing, are those whose reticular ratio c/a is close to the value 1,633.

The crystallographic characteristics of a given material whose reticular ratio c/a is remote of the above value, may be improved by alloying it with a second material such that the c/a reticular ratio of the alloy obtained be closer to the said preferred value 1,633 (by inserting or adding atoms of the second material into the lattice of the first material or by substitution of atoms of the second material for atoms of the first material). The choice of the second material (or of second materials) can be based on systematic studies of the alloys which the different elements are likely to form with one another, such as those reported in the book of Hansen "Constitution of binary alloys" — Mc Graw - Hill Book Company (1958).

In a similar fashion, the allotropic transformation temperature of the hexagonal crystals, which may be too low for some of the materials which otherwise possess excellent friction characteristics, can be raised by their alloying with an appropriate different material, whereby the conversion of the hexagonal structure from a certain temperature, onwards into a cubic structure which makes the frictional material adhere and unsuitable for the friction purpose, is prevented. Some of the compounds cited in Table I are likely to undergo such process. For instance cobalt, neodymium and titanium exhibit respectively allotropic transformations at temperatures of 417°C, 862°C and 882.5°C.

For instance the allotropic transformation temperature of cobalt can be raised by alloying it to minor proportions of metals such as aluminium, niobium, titanium, tungsten and molybdenum which do not entail a modification of the crystalline system. These proportions may be chosen in function of the desired increase of the allotropic transformation temperature, for instance, by resorting again to the equilibrium diagrams of cobalt and of the other mentioned metals appearing in the already cited book of Hansen. Accordingly, the original hexagonal structure of the crystals in the friction linings made of such materials can be preserved even when the friction apparatuses operate at high temperatures.

The magnetic properties of cobalt (especially in the case of friction linings for electromagnetic brakes and clutches) may also be improved by alloying it with proportions of neodymium, yttrium, iron or nickel which preserve in the alloy obtained the original hexagonal structure of cobalt. Still in the same way, it will also be possible to raise the Curie point of some frictional materials.

Other features of the invention will appear in the course of the following disclosure of preferred embodiments of the invention, in connection with the drawings in which:

FIGS. 12 to 15 show a portion of an armature on which linings are to be formed, at different stages of their production.

Figure 1:
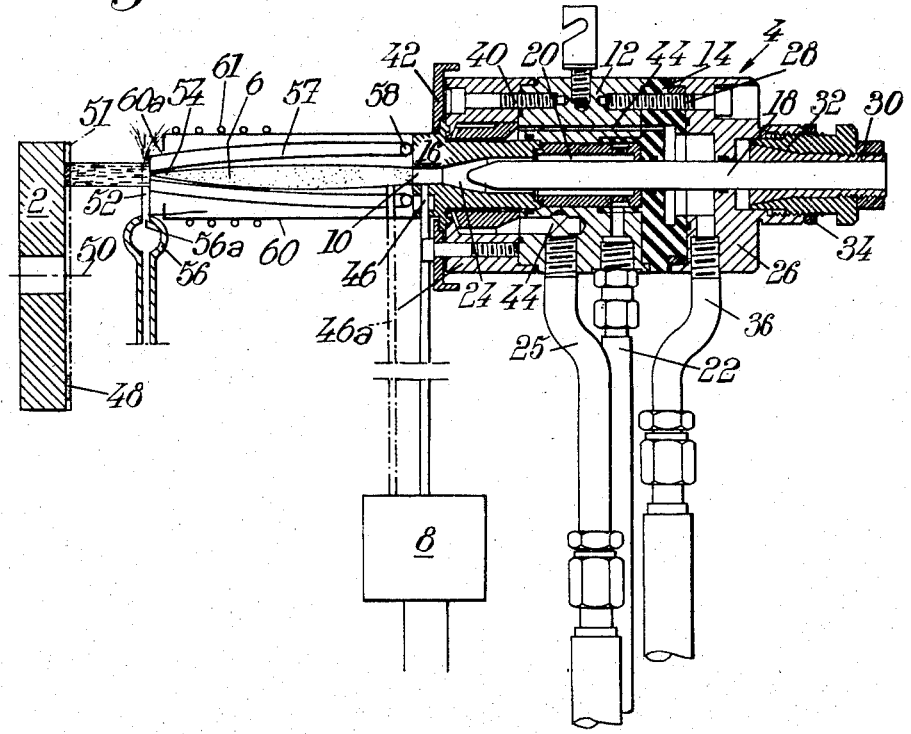
FIG. 1 shows diagrammatically an installation for carrying out plasma deposits of materials on a support.

An installation for producing the deposition of a friction lining on a support 2 is shown in FIG. 1. This installation includes a generator 4 producing a plasma jet 6 and a device 9 such as a conventional vibrating sieve for injecting a powder of the appropriate material in the plasma jet at or close to the output 10 of the generator.

The generator can be devised in any known fashion. The generator shown in FIG. 1 includes a central block 12 cooperating with an insulating cross member 14 for electrically insulating the anodic parts 16 from the cathodic parts 18. The central block includes diffusor means 20 supplied with a plasma forming gas through a conduit 22 and channeling the gas towards an arc chamber 24. The central block also includes an anodic electric current supply line 25.

The generator further comprises a rear block 26 secured to the central block 12 by means of screws 28 made of an insulating material. The cathode 18 formed of a thoriated tungsten rod is secured to the rear block through clamp means 32 which permit longitudinal displacements of the cathode relative to the anode. A nut 34 both takes up the play between the threads and ensures a good electrical contact between the rear block and the cathode when the same has been positioned. The rear block also includes the cathodic electrical supply line 36.

A front block 38 is secured to the central block by means of metallic screws 40. The anode 16, advantageously made of red copper or of cupro-tellurium, is locked in position into the front block through a flange 42.

A refrigerating circuit 44 supplied with water through a conduit associated to the anodic line 25 ensures a refrigeration first of the anode 16, the water then circulating within the central block and the rear block to refrigerate the cathode and from which it is removed by a conduit associated to the cathodic line 36.

The anode 16 also forms the plasma ejector nozzle and exhibits, as is well known in the art, an interior profile which is a function of the plasma forming gas being used and of the required velocity and temperature conditions. One or several injectors 46 of the powder injector 8 open into the plasma jet in the area of the nozzle outlet, i.e., either within or outside thereof, the powder being carried along within these injectors by a gaseous flow whose composition is advantageously the same than that of the plasma forming gas. The particles of the powdered material injected into the plasma jet are driven by the same towards the support.

The support 2 is positioned transversely to the path of the particles carried by the plasma jet by any known means. In the preferred embodiment of the invention, where the support 2 consists of a brake or clutch armature adapted to enter in frictional engagement with a complementary armature, means are provided to drive the armature in rotation about its axis 50. An annular friction lining 48 is thus formed, especially if those parts of the armature which are not to be covered by the friction lining are protected by a mask 51, diagramatically shown in dash and dotted lines on FIG. 1.

Prior to the deposition of the molten material, the support 2 is subjected to a sanding or analogous treatment, for the sake of obtaining a rough surface whose recesses and asperities will cooperate to the subsequent mechanic anchoring of the friction lining on said surface.

The process according to the invention comprises controlling correlatively the ejection velocity of the plasma 6, on the one hand, the sizes and the flow rates of the particles of the powder material introduced into the plasma jet, on the other hand, to values such that, taking in account the nature of the plasma forming gas and the power of the generator, said particles be molten in their mass while their being carried within the plasma jet, more particularly within the plasma tip; and forming a gaseous barrier 52 transverse to the plasma jet, between the outlet 10 of the generator and the support 2, under a flow and a velocity adapted to break the flow of the hot gases of the plasma jet which carries the molten particles which, due to their kinetic energy, pass through said gaseous barrier without any deviation.

Figure 2:
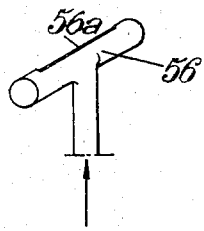
FIG. 2 is a perspective view of a detail of this installation.

The means 56 adapted to form this gaseous barrier include a slot 56a extending on certain length. These means include for instance, as shown in FIG. 2, a tube element provided with a longitudinal slot 56a supplied with gas, for instance air under pressure, by a not represented source, said tube element being positioned such that the gaseous barrier 52 be formed in a plan substantially perpendicular to the direction of the plasma jet 6, substantially at the level of the tip extremity of the plasma jet. The effect of this gaseous barrier is thus to prevent the overheating of the support 2 in the course of the deposition and also to deviate the non molten particles carried tangentially along the periphery of the plasma jet, whereby an homogeneous deposit essentially formed of previously molten particles is formed on the support. Additional cooling means, not represented, should of course be provided for the cooling of the support.

It has been found that the complete melting of the particles projected onto the support is an essential condition to the quality of the deposit obtained. To achieve this result, the different parameters of operation of the plasma generator can be acted upon in a known fashion, such parameters being among others, the composition of the plasma forming gas, the rate of supply in plasma forming gas to the generator, the profile of the ejection nozzle 16, the electric power dissipated between the electrodes, etc.

For the purpose of determining experimentally the appropriate values of these parameters, it is convenient to take in account the ejection velocity of the plasma which is dependent among other upon the electric energy dissipated in the generator, since this ejection velocity affects the time the particles are maintained within the plasma. As a matter of fact, a plasma of too low velocity would not be hot enough and accordingly would not allow the complete melting of the particles. In the contrary, if the plasma velocity is too high, the particles will not be maintained long enough within the plasma jet to be molten, despite the very high plasma temperature so achieved. The velocity minimum and maximum limits can be determined experimentally for each material, taking in account especially its melting point.

Another parameter of importance, is the range of particles sizes. If these sizes are too low, the particles melt and volatilize before reaching the support. If they are too high they will not be completely molten within the short time they are maintained within the plasma. Correlatively, it will be necessary to control the rate of injection of the powders in the jet of plasma since the temperature of the latter is also dependent upon this last parameter.

Figure 3:
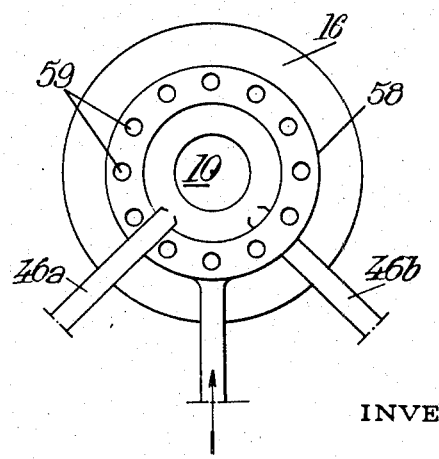
FIG. 3 is a front view at a greatest scale of a part of the installation of FIG. 1.

The area of injection of the powders can also be chosen dependent upon the melting points of the materials used. Materials melting at very high temperature, such as the tungsten carbides $CW_2$ may be injected in the plasma jet still within the front portion of the nozzle 16, for instance through a conduit 46, as shown in FIG. 1, while materials melting at lower temperatures may be injected into the plasma jet downstream from the nozzle outlet, through injectors such as 46a (shown in dash and dotted lines in FIG. 1) at distances which increase as the melting point of the injected materials decrease. Recourse may be had to several of such injectors, in case it is desired to simultaneously inject different materials with respectively different melting points. niobium;

For instance, if it is desired to form on the support surface a friction lining containing tungsten carbide $CW_2$, cobalt and iron, which melt respectively at 2,850°C, 1,495°C and 1,100°C, the tungsten carbide will be injected within the nozzle 16 of the generator through injectors 46, the cobalt through an injector 46a opening at a distance of 1 mm from the nozzle outlet and the iron through an injector 46b (FIG. 3) opening into the plasma jet at a distance of 3 mm from the outlet of the nozzle if, like in the examples given hereafter by way of indication, the length of the plasma tip is of 5 mm.

As a matter of general practice, a friction lining formed of an alloy or of a combination of different materials may be obtained:

either by introducing into the nozzle or within the plasma jet close to the nozzle outlet, either a preformed corresponding alloy containing all the above components or a mixture of these components;

or by introducing the different components in the plasma jet, through distinct injectors opening into the plasma jet at distances from the nozzle outlet depending upon their respective melting points.

In the last case, the respective proportions of the different components for producing a friction lining having a given composition, are determined experimentally by resorting for instance to analysis of the friction lining produced with the Castaing microgauge. These proportions can vary substantially dependent upon especially the composition of the plasma forming gas used and of the electric power dissipated in the generator.

In order to obtain a friction lining containing 70 percent of chromium oxide $Cr_2O_3$ and 30 percent of an alloy of tungsten carbide CW or $CW_2$ with 20 percent of cobalt, the proportions of the different components injected into the plasma jet may vary from 50 to 90 percent of chromium oxide, 10 to 50 percent of tungsten carbide and 10 to 30 percent of cobalt.

For instance, starting from the above materials injected into the plasma jet under determined proportions, the lining formed will contain more tungsten carbide, less chromium and more cobalt when using a plasma containing 70 percent of argon and 30 percent of nitrogen, the same amounts of chromium and of tungsten carbide but less cobalt when using a plasma containing 70 percent of argon and 30 percent of hydrogen, more chromium and less tungsten carbide and cobalt when using a plasma containing 70 percent of nitrogen and 30 percent of hydrogen.

Advantageously use is made of a gaseous sheath 57 formed of a neutral gas, such as argon, at the periphery of the plasma jet. This gaseous sheath provides in particular for an increase of the length of the plasma tip, so that the time the particles injected in the plasma jet remaine therein will be enhanced. In addition this sheath protects the plasma jet from the ambiant atmosphere and avoids to a large extent undesirable reactions of the injected and molten particles with the ambient atmosphere. This gaseous sheath 57 can be formed for instance by an injection system 58 provided adjacent the outlet 10 of the generator or of the nozzle 16, said system comprising either an annular slot supplied with the neutral gas or a plurality of ejection apertures 59 (FIG. 3) provided on a ring surrounding the plasma outlet.

The protection of the plasma jet may also be improved by resorting to a housing 60 associated to strong refrigerating means 61, said housing surrounding the plasma jet and being provided with an aperture 60a in its extremity for the passage of the plasma stream and of the particles carried by it. If need be, the whole operation may be performed in a tight chamber or caisson, under neutral or depressed atmosphere.

There is thus obtained a process and an installation for producing on a support a friction lining resulting from the projection thereon of molten drops and solidification thereof. It will be appreciated that the degree of melting of the particles injected in the plasma jet can be easily checked, and that accordingly the operating conditions of the generator can be easily controlled, if the molten particles are received in a water containing vessel in which they are solidified. It appears that if they have been molten completely they solidify in the form of spherules. FIGS. 4 to 7 are reproductions of scanned photographies made under an electronic microscope, of spheroidal particles 63 so obtained.

Figure 5:
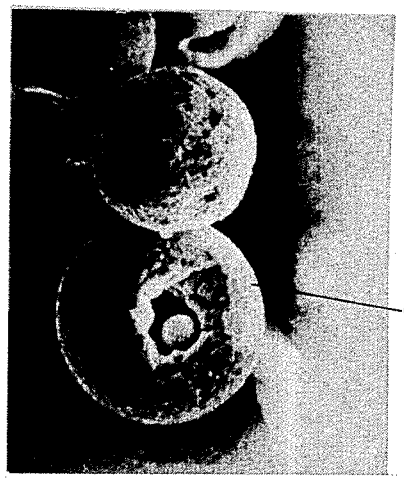
FIGS. 5 to 7 are photographies made under an electronic microscope with scanning means of particles of the same material after they have been injected into and carried with a jet of plasma and hardened in a liquid.
Figure 4:
FIG. 4 is a photography made with an electronic microscope with scanning means of particles of a material suitable for use in a lining according to the invention.
Figure 7:
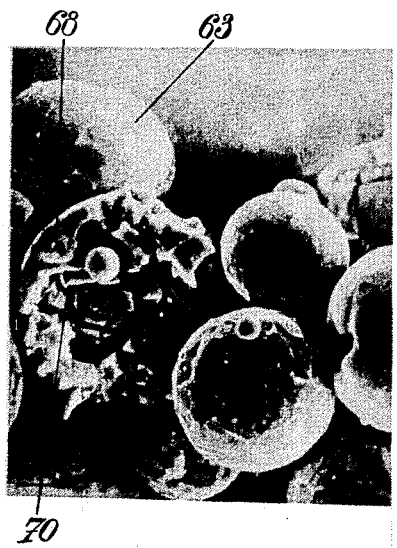
Figure 6:
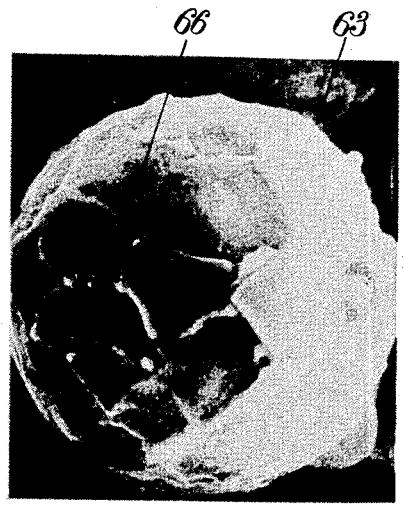
Figure 8:
FIGS. 8 to 11 are photographies under an electronic microscope of parts of a friction lining formed by the process according to the invention.
Figure 9:
Figure 10:
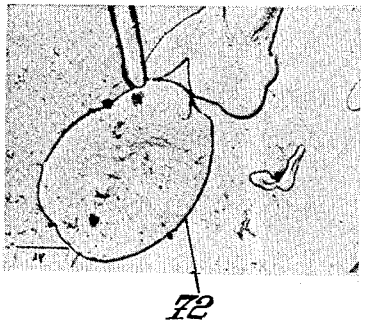
Figure 11:
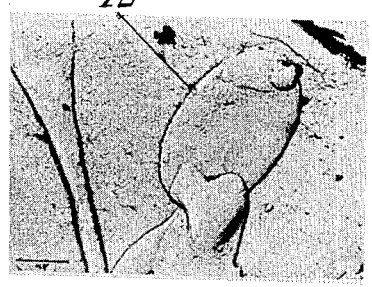

The spherules shown in FIGS. 5 to 7 are formed of chromium oxide $Cr_2O_3$. FIG. 4 is a photography under the electronic microscope of one of the original particles 64 of the chromium oxides, which particles exhibit a characteristic laminated aspect bounded to their hexagonal crystalline structure. After melting within the plasma jet and solidification in water, the same particles which have substantially the same average sizes have lost their laminated aspect and exhibit a multiplicity of little facets, if they underwent complete melting. In FIG. 9 there is shown a particle 68 which has not been completely molten. Fractures and deep faults appear within the mass of the particle. The original laminated aspect is preserved in those of the portions which did not undergo complete melting and which accordingly are easily recognizable, as in 70. Linings made of such particles possess neither the desired friction characteristics nor the required cohesion.

The friction linings formed on the support with solidified particles previously completely molten, exhibit a characteristic aspect. Their surface is rather homogeneous and is free of hard spots. FIGS. 8 to 11 are photographies under the electronic microscope of such linings. The different particles of the lining which imbricate in one another have kept the smooth contours of the liquid spherules as they arrived on the support. An ultrasonic analysis of such linings brings into evidence a strong cohesion at the support-lining interface.

The examination of these linings under X-rays and electronic diffraction further shows that the base planes 0001 of a major proportion of the crytals in the lining are oriented in directions substantially parallel to the surface on which the lining has been formed.

Figure 12:
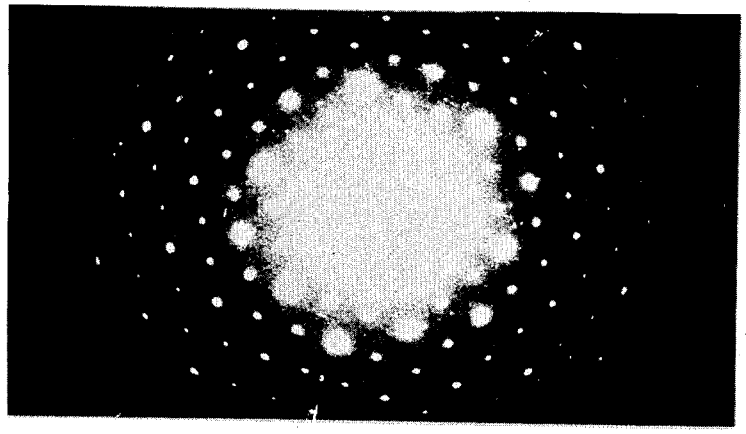
FIGS. 12 and 13 are electronic diffraction photographies performed on crystals of a friction lining according to the invention, respectively before and after frictional engagement.

FIG. 12 is the reproduction of an electronic diffraction picture taken on one crystal at the surface of the lining before any frictional engagement with a similar lining. The preferential orientation of the crystal along its base plane 0001 is brought into evidence by the regular distribution of the spots on the photography. This orientation also happens to be the most favorable to the friction properties of the crystals.

Figure 13:
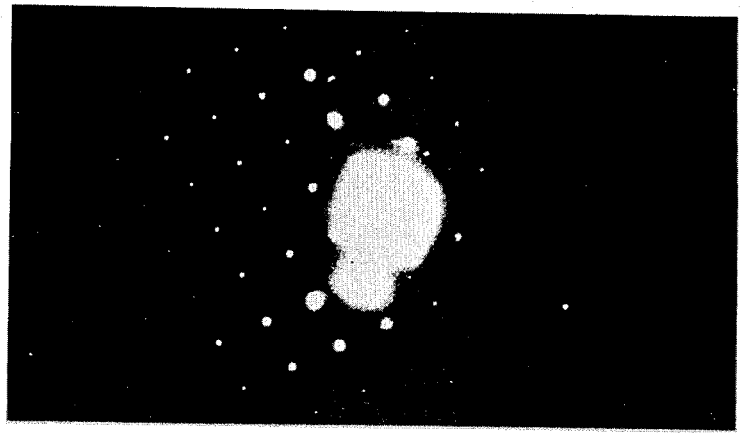

FIG. 13 shows an electronic diffraction picture performed on the same crystal, after a certain number of friction engagements of the armature carrying said lining with a complementary armature including a similar lining. This last photography makes clear that one of the pyramidal planes of the hexagonal structure has been substituted for the base plane 0001. The satisfactory friction properties of such hexagonal materials may be ascribed to the great number of reticular planes which are available in the hexagonal system. This possibility of plastic deformations of the crystals at the level of their crystalline structure possibly also accounts for their resistance to wear. The tearing of superficial micro-fragments of the linings thus appears as the ultimate stage of the wearing process which takes place only when they underwent to a strong cold-hardening.

The above plastic deformations are only superficial. The preferential orientation of the base planes 0001 along a direction parallel to the lining surface is found again after a metallographic polishing of the superficial cold-hardened layer.

Figure 14:
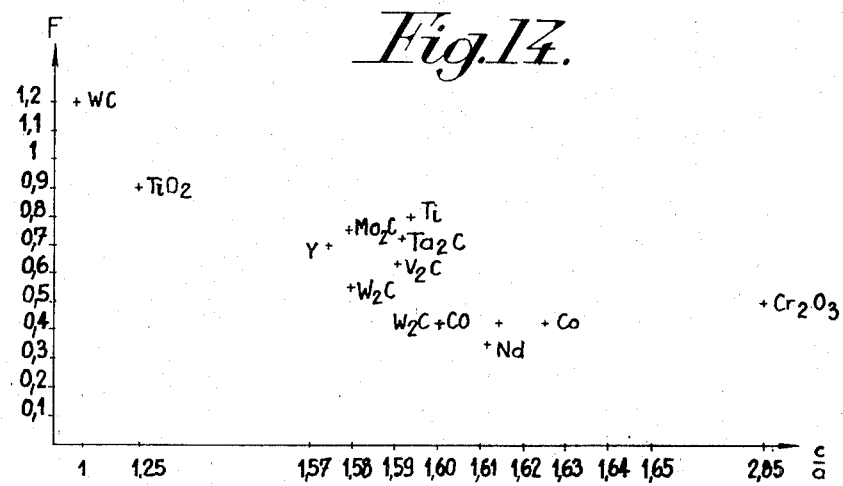
FIG. 14 is a diagram bringing into evidence some relation between the reticular ratio c/a and the friction coefficient of a certain number of hexagonal materials.

It has also been found that there is at least an approximate relation between the reticular ratios c/a of the hexagonal materials and their friction coefficients. This relation appears in the Table of FIG. 14 wherein the friction coefficients F have been reported versus the reticular ratios of a number of hexagonal materials. The measures were performed in ultra-vacuum ($10^{-11}$ Torr) by means of two discs on which friction linings were produced according to the above process, said discs having been brought in frictional engagement under a load of 5 kg/cm$^2$ and under a relative speed of 1m/s. As visible in FIG. 14, materials having a reticular ratio c/a in the area of 1,61 to 1,63, exhibit a particularly low friction coefficient, accordingly with a low risk or seizure during friction.

Linings having reticular ratios close to 1,633 may also be 6btained starting from tomponents whose lattice relation c/a is remote from the preferred value, but which, when alloyed to appropriate other components, will produce compositions having a more favorable reticular ratio. At the same time other parameters may be taken in account. Advantageously, at least one of the components of the alloy should exhibit a great hardness, while another should be softer.

The harder component will increase the contact rigidity, in other words, the elastic deformations of the salient points of the surfaces undergoing friction. It has been found that the harder the friction material the greater the frequency of the vibrations bound to the friction. It is thus possible, thanks to the presence of the hard component in the lining, to displace the frequency of the vibrations bound to the friction towards a domain of values sufficiently remote from the natural frequency of the whole assembly of parts entering into friction, in order to avoid any possible confusion of frequencies which would yield an auto-excitation of said natural frequency.

The soft component may, in a certain fashion, act as a damper and, to a certain extent, like a lubricant.

For instance an alloy of chromium oxide $Cr_2O_3$ (c/a = 2,761) of cobalt (c/a = 1,624) and of tungsten carbide $W_2C$ (c/a = 1,578) in the proportions indicated in the Table below, contains phases whose reticular ratios c/a are close to 1,633. In these alloys the hard chromium oxide further increases the contact rigidity whereas the softer cobalt provides for a dampening of the vibrations and to a certain extent acts as a lubricant.

In the Table II below, the complete compositions of the different alloys are deducted from the percentage values given in the horizontal lines.

TABLE II

| Co % | CW$_2$ (ou CW %) | Cr$_2$O$_3$% | Cr$_3$C$_2$ (ou Cr) % | Mo % | Ni % |
|---|---|---|---|---|---|
| 75 |    |    |    | 25 |    |
| 65 | 35 |    |    |    |    |
| 75 |    |    | 25 |    |    |
| 15 | 70 |    | 15 |    |    |
| 70 | 15 |    | 15 |    |    |
| 70 |    |    | 17 | 13 |    |
| 45 |    |    |    | 20 | 35 |
| 50 |    |    | 20 | 10 | 20 |
| 6  | 24 | 70 |    |    |    |
| 14 | 56 | 30 |    |    |    |
| 10 | 40 | 50 |    |    |    | preferably the material of the friction linings exhibit a point of allotropic transformation as high as possible, in order to avoid allotropic transformations during the friction. If need be, the allotropic transformation point of any given friction material can be raised by alloying to it a second appropriate material, as indicated hereabove. For instance, the rather low allotropic transformation point of cobalt (417°C) is raised by alloying it with up to 25 percent of molybdenum. An alloy of 75 percent of cobalt and of 25 percent of molybdenum has a point of allotropic transformation of about 980°C.

Figure 15:
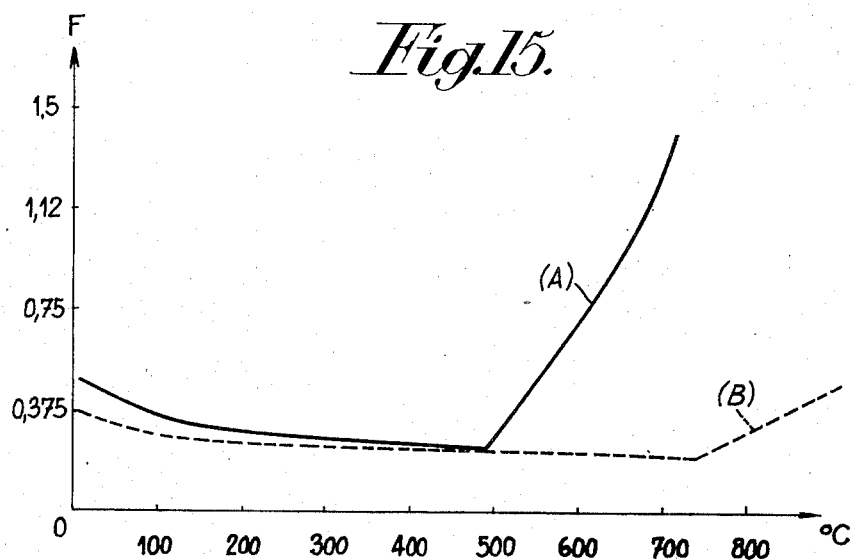
FIG. 15 is a diagram showing the variations of the friction coefficient as a function of temperature for certain friction materials according to the invention.

The effect of the alloying of molybdenum on the point of allotropic transformation of cobalt or cobalt containing alloy is clearly brought in evidence by the curves of FIG. 15 showing the variations of the friction coefficient F (on the axis of ordinates) in function of temperature (in degrees Celsius on the axis of abscissae) for the linings of two discs, one of which is maintained in a fixed position, brought in frictional engagement, under a load of 5 kg/cm² and a relative speed of 1 m/s under a vacuum of 10⁻¹¹ Torr. The temperature was measured by means of a thermocouple whose junction was brought close to the friction surface of the fixed disc.

Curve A shows the variations of the friction coefficient under those conditions of a lining containing 70 percent by weight of cobalt and 30 percent by weight of tungsten carbide $W_2C$.

Curve B relates to the friction characteristics of a lining formed of an alloy containing 60 percent by weight of cobalt, 20 percent by weight of $W_2C$ and 20 percent by weight of molybdenum.

These two alloys exhibit normally a hexagonal structure. As visible in FIG. 15, the friction coefficients measured undergo sudden changes at a temperature of about 470°C as concerns the alloy $Co/W_2C$ (curve A) and at a temperatures slightly below 800°C as concerns the alloy which in addition contains molybdenum (curve B). These changes in the friction coefficient coincide with the allotropic transformation of the hexagonal structure of the above alloy into a cubic structure. It will be noted that upon cooling, the above linings exhibit again their respective low original friction coefficients.

In addition to showing the effect of molybdenum on the point of allotropic transformation of the above alloys the curves of FIG. 15 also bring into evidence the far greater friction coefficient of the same alloys, when they exhibit a different crystalline structure. These far higher friction coefficients do not authorize a progressive and regular friction engagement, without seizing, of the corresponding surfaces.

Preferably, the two linings of two surfaces brought into friction engagement are different from a chemical standpoint, though they should both possess a hexagonal crystalline structure. The difference in chemical nature is desired to avoid risks of mutual adhesion resulting from a possible mutual solubility of the opposite lining materials. It will be advantageous to bring carbide containing linings in friction with oxides containing linings.

As a general rule, the use of refractory oxides and carbides all having a hexagonal crystalline structure is preferred because of their hardness, which results from the compacity of their crystalline structures and of the inter-atomic forces which bond the atoms to one another, the reduced work of plastic deformation of their superficial layers, thanks to the preferential orientation of their base planes 0001, especially when their reticular ratios are close to 1,633 and of their low adhesion of contact.

In order to further illustrate the invention, in a non-limitative fashion, examples of the values of the different parameters which permit the obtaining of satisfactory linings when using especially the alloys defined in the above Table II, will be given herebelow.

The components of the alloy are injected in the plasma jet under any one of the three modes of operation indicated hereabove, i.e.:

injection in the plasma jet of a mixture of the components forming the said alloys in the lining, separate injections of the different components of the alloy at different points in the plasma jet, injection of a powder of the pre-formed alloy.

Linings made of the said alloys can be formed by resorting to the following parameters:

diameter of the ejection output of the nozzle 16 of the plasma generator: 6 to 16 mm distance of the support from the tip extremity: about 5 cm compositions of the plasma forming gas: mixtures of argon and hydrogen or of argon and nitrogen or of nitrogen and hydrogen, for instance, mixtures of argon and hydrogen in a ratio of 75 L. d'argon to 16 L. of hydrogen.

flow-rate of the plasma forming gas: 75 l/mn of argon, 16 l/mn of hydrogen, ejection velocity of the particles carried in the plasma: 100 to 500 m/sec.

electric power dissipated in the plasma jet: 24 to 28 kW (for instance 310 A under 80 V, or 620 A under 45 V or 800 A under 30 V)

average sizes of the particles injected into the plasma: 20 to 40 microns amounts of powder injected in the plasma jet: 500 to 1,000 g/hour supply pressure of the gases in the ejection system 56 for forming the gaseous barrier 52:3 bars flow-rate of the gases in the gaseous barrier: 30 to 50 m³/hour gas in the gaseous sheath 61: argon flow-rate of the gas supply to the injector 60 of the gaseous sheath: 5 to 15 l/hour.

The duration of the deposition varies from a few seconds to a few minutes, dependent upon the desired thicknesses for the lining, these thicknesses varying from a few hundreds to a few tens of a millimeter.

The process according to the invention can be applied to the forming of linings made of any other materials than those contemplated hereabove. The friction linings disclosed hereabove can also be used in conjunction with other types of lining on the surface of a same armature. In particular, in accordance with an additional embodiment of the invention, different linings of different materials having their respective surfaces flush with one another, are formed on a same support, especially when the original surface of the latter was provided with protruding portions. Such types of composite linings are advantageously resorted to for constituting the linings of the armature of magnetic clutches or brakes, which linings must both provide for a satisfactory friction and for the closing of a magnetic circuit adapted to press the complementary armatures against one another.

The armature according to the invention which is adapted to enter in frictional engagement with a complementary armature comprises an annular support including on its surface at least one annular projection and a lining formed on this surface, said lining including a first layer made of magnetic material covering the whole annular surface including the projecting portions, the said first layer being exposed on the lining surface at the level of said annular projecting portion, and a second layer of a friction material formed on said first layer above the remaining portions of said surface and flush with the exposed portion of the first layer, the crystals of the material of the second layer belonging to the crystalline hexagonal system with a major proportion of their base planes 0001 substantially oriented in directions parallel to the linings surface.

Such linings may be formed on such supports by applying on their surfaces a first layer of magnetic material, then a second layer of the friction material by resorting to the process according to the invention and then by polishing the surface of the lining until the first layer becomes exposed above the said mentioned projecting portions.

Figure 19:
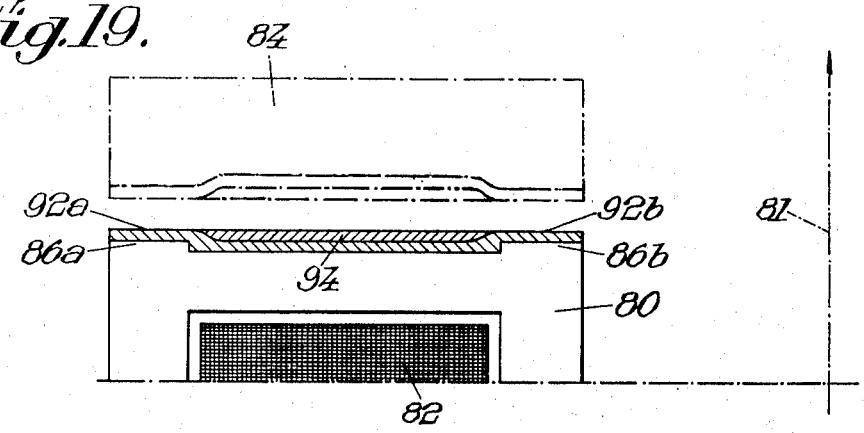

A section through a part 80 of a rotor (in the case of a clutch) or of an annular inductor (in the case of the brake) is shown in FIG. 19, its axis being diagramatically shown by the dash and dotted line 81. This armature is adapted to cooperate in a fashion known, per se, with a coil 82 for attracting and either drive or in the contrary stop a complementary armature 84 diagramatically presented in dash and dotted lines and having a lining of the same type than said rotor or inductor, when the said coil is energized.

In a preferred embodiment of this armature, the lining includes one interior and one exterior exposed annular zones of a magnetic material such as iron or Fe, Co, Ni alloys which possess the desired ferro-magnetic properties for the passage of the lines of magnetic forces of the magnetic field between the rotor and the opposite armature, the remaining areas of said armatures, between said interior and exterior zones, consisting of a friction material of the type disclosed hereabove.

Figure 16:
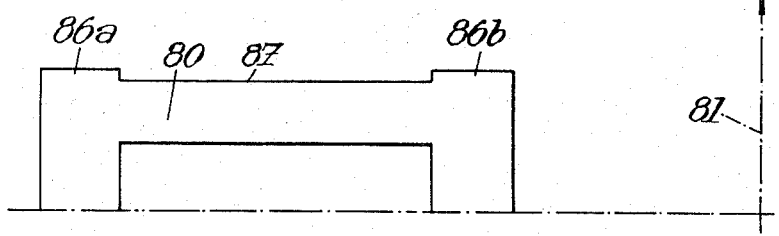
Figure 17:
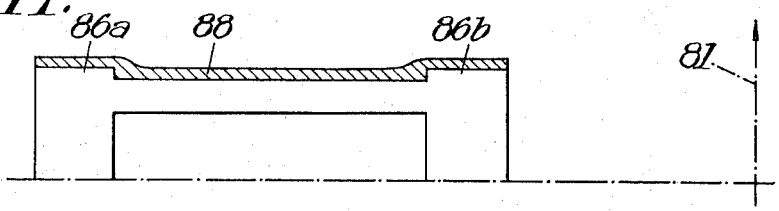
Figure 18:
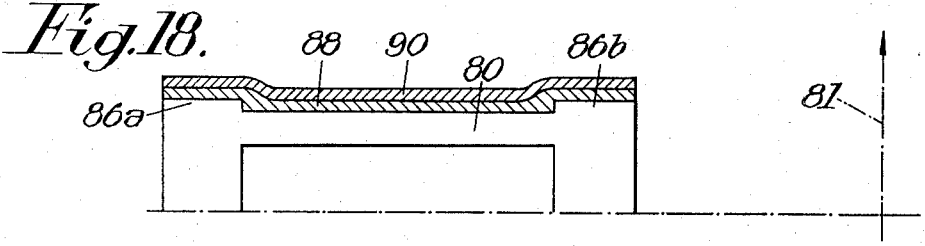

FIGS. 16 and 18 show the successive phases of the forming of such a lining on an armature support including interior and exterior annular projections 86a, 86b. A first layer 88 of the material having the desired magnetic properties having a thickness preferably lower than the height of the projecting portions 86a, 86b, is formed first, both on said annular projections and on the intermediate zone 87 of the armature shown in FIG. 16, whereby a lining as diagramatically represented in FIG. 17 is obtained. A second lining 90 is formed thereafter with a material possessing the desired friction characteristics, the thickness of this second layer being such that the sum of the first and second layers be greater than the height of the annular projections 86a, 86b (FIG. 18). The surface obtained is then subjected to a polishing operation with a diamond grinding wheel until the parts of the first lining above the projection 86a, 86b become exposed. The lining with a plane surface is thus obtained with the annular magnetic zones 92a, 92b for the passage of the lines of force of the magnetic field produced by the coil 82, flush with the intermediate zone 94 of the friction material of the second layer providing for the favorable friction conditions, when the opposite surfaces of the armatures are engaged in friction. The friction material of the intermediate exposed layer 94 is harder and more resistant to wear than the material of the annular zones 92a, 92b in order to avoid undesired alternate wearing processes of the said first and second layers.

These layers are easily formed especially with those of the installations disclosed hereabove which include several distinct injectors 46, 46a, 46b... for each of the materials to project on the support, these injectors being alternately brought into service. If desired, a progressive passage from the first layer to the second layer can be produced by starting the projection of the friction material on the support before the projection of the magnetic material is ended.

Linings are thus obtained which possess numerous advantages, some of which have already been indicated in the disclosure hereabove. Their essential advantages will nevertheless be recalled hereafter.

They possess a resistance to wear considerably higher than the conventional organo-metallic linings generally used. They may be used under high temperature conditions without risks of being deteriorated.

Since these linings are formed directly on the surfaces of the armatures, the construction of the latter can be simplified extremely. No intermediate brake lining supports are needed any more, as this is the case in most of the conventionally used friction parts of the friction apparatuses. The armatures can consist simply of crude castings.

The friction linings according to the invention can also operate without deterioration risks in corrosive as well as in fatty atmospheres, for instance, in oil mists. The reduction of the friction coefficient sometimes observed in the last instance, is only temporary and of minor importance. The heating of the friction surfaces which results from the reduction of the torque related to the decrease of the coefficient friction then produces a cracking of the oil droplets imprisonned between the friction surfaces whereby the friction torque is rapidly brought back to its original value. As a consequence, the friction surfaces according to the invention, can not be impregnated.

The friction linings according to the invention are suitable for use in motors, brakes, electromagnetic clutches and brakes, rotary seals, operating in friction in the presence of a lubricant or not, friction dampers, for the braking of vehicles, for parts operating in ultravacuum, etc.

The process according to the invention may also be used for forming any other type of linings, such as insulating linings containing alumina or thin deposits of semi-conductor components, etc.

What is claimed is:

1. Friction armature comprising an annular support and a lining formed on its surface, the latter including at least one annular projection and the lining including a first layer made of a magnetic material covering the whole annular surface including the annular projection and being exposed on the lining surface above said projecting annular portion, and a second layer of a friction material exposed at the surface of said lining above the remaining portions of said support surface flush with the exposed portion of the first layer, the crystals of the material of the second layer belonging to the crystalline hexagonal system with a major proportion of their base planes 0001 substantially oriented in directions parallel to the lining surface.

2. Friction armature according to claim 1, wherein said crystals are formed of particles whose sizes range from about 10 to about 75 microns and wherein the base planes 0001 of more than 80 percent of the crystals are oriented in directions substantially parallel to the surface of the support on which said lining is formed.

3. Friction lining according to claim 2, wherein said crystals have sizes ranging from about 20 to about 40 microns.

4. Friction armature according to claim 1, wherein the support comprises one interior and one exterior concentric annular projecting zones, said first layer being exposed at the surface of the lining above said annular projecting portion and said second layer being exposed at said lining surface above the portion of said support which separates said interior and exterior projecting portions.

5. Friction armature according to claim 1, wherein the material of said first layer consists of an iron-cobalt-nickel alloy and wherein said second layer consists of an alloy of cobalt alloyed to at least one of the components selected from the class consisting of CW, CW$_2$, Cr$_2$O$_3$, Cr$_3$C$_2$, Cr and Mo.

* * * * *